July 10, 1928.                                                              1,676,482
O. H. DE LAPOTTERIE
METHOD AND MEANS FOR THREADING NUT BLANKS
Filed Dec. 5, 1921
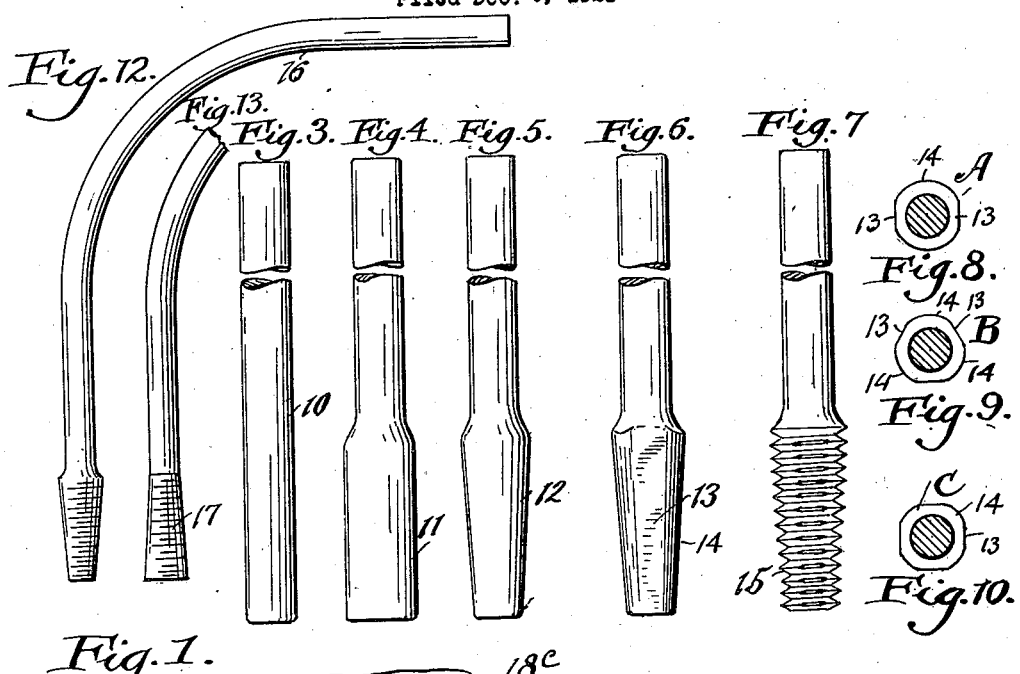
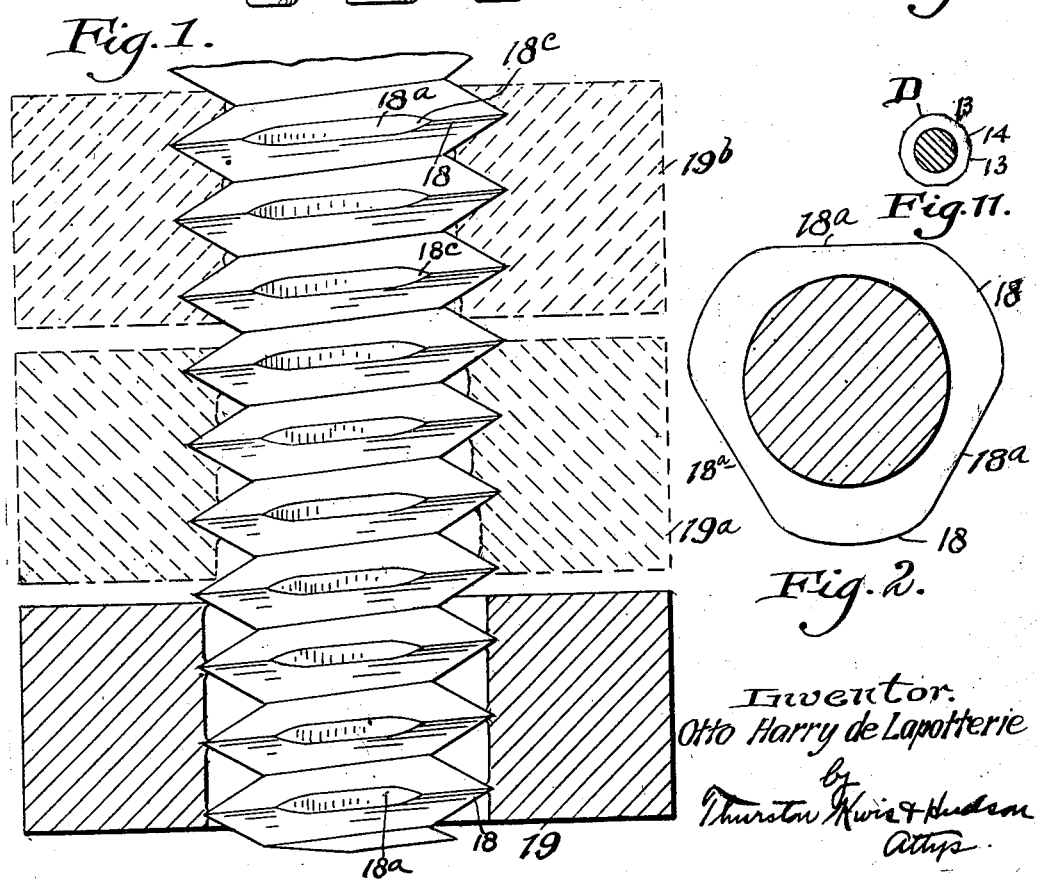
Inventor.
Otto Harry de Lapotterie
by
Thurston Swis & Hudson
Attys.

Patented July 10, 1928.

1,676,482

UNITED STATES PATENT OFFICE.

OTTO HARRY DE LAPOTTERIE, OF KENT, OHIO, ASSIGNOR TO ROY H. SMITH, OF KENT, OHIO.

METHOD AND MEANS FOR THREADING NUT BLANKS.

Application filed December 5, 1921. Serial No. 519,902.

This invention relates to a method and means for threading nut blanks, and has for its object to produce a method and a tool by which nut blanks may be threaded by a swaging action which involves the re-shaping or re-forming of the metal instead of a cutting or removal of the metal as when a thread is formed in a blank by an ordinary tap.

At the present time threads are commonly swaged on bolts with numerous advantages over the thread cutting process. It is a known fact that a cut thread is not as strong as one which is forged or swaged, as the cutting operation merely removes a portion of the metal without strengthening it, whereas the thread swaging process causes a stronger and tougher thread. Other objections to the thread cutting process which are applicable both in threading nuts and bolts, are that the tools necessary to do the cutting are expensive to make and keep sharp, and the chips or scrap formed by the cutting operation result in a loss of metal, which can be only partially recovered, and additionally the chips are troublesome and they dull the keen cutting edge necessary to cut a good thread. It is also a matter of common knowledge that considerable pressure is necessary to start a nut blank on a thread cutting tool, and that sometimes this pressure causes a blank to be threaded on the bias, thereby making it unfit for use, and at times causing breakage of the cutting tool, particularly if the holes in some of the blanks employed are off-center.

As far as I am aware, no process or apparatus has ever been devised whereby nut blanks could be threaded on a commercial basis by a thread swaging process, and therefore the advantages both in the process and product attending the art of swaging the threads on bolts have not been attainable in forming the threads in nut blanks. I am aware of the fact that it is customary to form threads in relatively thin metal, such as sheet metal caps for receptacles, by swaging the threads, and in such cases the threads are formed both internally and externally by deforming the metal for its entire thickness. And I am aware of the fact that it has been proposed to swage the thread in a sheet metal cap without displacing the metal at the outer part of the cap, but as far as I am aware, this proposal has never been successfully carried out, but in any event, it would not be suitable for small work as well as large work.

By my invention the nut blanks are threaded by a swaging or re-shaping action as distinguished from a cutting action, wherein the metal is cut out to form the thread grooves, and I am thus enabled to overcome the disadvantages heretofore enumerated of cutting or tapping the threads and at the same time a superior product is produced in the way of a stronger thread.

The invention may be briefly summarized as consisting in certain novel steps of the improved method and details of the apparatus which will be described in the specification and set forth in the appended claims.

In the accompanying sheet of drawings wherein I have shown my improved method and various forms of thread forming tools which may be used, Fig. 1 is a view showing on an enlarged scale the thread forming portion of a threading tool and showing the nut by full and dotted lines in several positions along the tool so as to illustrate the manner in which the thread is gradually and continuously formed by the re-shaping or re-forming of the metal as the blank and tool are relatively moved by the axial movement of one relative to the other accompanied by a rotation of one relative to the other; Fig. 2 is a sectional view through a thread forming tool which may be employed advantageously in the process illustrated in Fig. 1; Fig. 3 is a view showing a section of round stock which is used in forming the tool; Figs. 4, 5 and 6 are similar views showing successive forms that the head of the tool assumes in the process of making the tool; Fig. 7 is a similar view showing the head or thread forming portion of the tool completed; Figs. 8, 9, 10 and 11 are end views of the tool showing different shapes that the head or thread forming portions of the tool may assume; and Figs. 12 and 13 are side views of the finished tool with the shank curved or bent to adapt the tool for well-known forms of nut threading machines.

The tool which is used by me in forming the threads may assume different forms, but it is characteristic of the tool in all the different forms it is made to assume, that it is devoid of cutting edges or faces, and has a series of thread swaging points or portions with intermediate portions of reduced thickness or radii.

In producing the tool, a piece of round tool steel of suitable diameter and length, such as indicated at 10 in Fig. 3 is selected. The piece 10 is next forged or swaged in such a manner that one end thereof, indicated at 11 in Fig. 4, is sufficiently enlarged to permit shaping.

The enlarged portion 11 is next machined or otherwise worked so that the enlarged end assumes a taper such as shown at 12 in Fig. 5.

Next the tapered section 12 is slab-sided or provided with a number of spaced longitudinally extending flat faces 13 which lie between the rounded circular shaped portions 14, this being shown in Fig. 6. The number of such flat faces and intermediate rounded portions will depend upon the number of swaging portions that the tool is to have, and in this respect the shape of the tool may be varied considerably. If the tool is to have two swaging portions it will have two opposite flat faces as indicated by the end view of the tool A in Fig. 8. On the other hand, the tool may have three, four or five turning portions and intermediate flat portions, as indicated at B, C and D in Figs. 9, 10 and 11, or there may be even a greater number.

Next the tapered and slab-sided section has threads of the style and number per inch desired, machined on it. This threading may be done in different ways, but I prefer to do this by rolling the shaped tapered section in any of the well-known types of bolt threading-rolling machines. This produces a threaded taper section such as shown at 15 in Fig. 7. I find that there is an advantage in rolling the threads on the tapered head of the tool for the thread rolling dies very slightly raise the full depth threads above the flat threaded portions leaving what I believe to be a somewhat enhanced relief space between the full threaded or swaging portions of the threaded tool. Furthermore, the thread swaging action of the tool is somewhat better when the threads are rolled on it than when they are cut on the tool.

When the shank of the tool has been shaped to best adapt it for being held or revolved in any of the various types of nut threading machines, the tool is ready for the thread swaging operation. In Fig. 12 the shank of the tool is given a lateral bend or curvature as indicated at 16, so that it may be held in place as the nut blanks are fed along the shank, but it is immaterial to my invention whether the blanks are fed onto the threaded end and then onto the curved or bent shank, or first along the curved or bent shank and then onto the threaded portion, as the latter method involves simply a reversal of the direction of the taper with respect to the shank, as is illustrated at 17 in Fig. 13.

As above stated, the number of swaging portions that the tool may have separated by the relatively flat portions may be varied, but I have used to advantage a tool having three such swaging portions, and for that reason I have in Figs. 1 and 2 illustrated this form of the tool in enlarged views.

It is characteristic of the tool, regardless of the number of swaging portions and relatively flat portions, that the thread is full formed for the entire length of the tapered portion or head of the tool on the several curved or rounded swaging portions, this being indicated at 18 in Fig. 1, and that in the relatively flat portions the thread is not full formed, but is flattened, as indicated at 18$^a$ in Figs. 1 and 2.

A nut blank of the shape desired, is prepared by any of the well-known methods, such as by cutting, pressing, forging, etc., with a hole slightly larger than the smaller end of the threaded tapered end of the tool, and smaller than the larger end thereof. The size of the hole in the blanks will vary in proportion to the thickness of the blank, and the type of metal and number of threads per inch it is desired to produce.

Next, if a nut blank prepared as above described, is placed in such a position that the smaller end of the tapered section of the thread swaging tool may freely enter it, by a movement of one part axially of the other, and if the tool or blank is rotated while the other part is held stationary, the following action results:

1. As the thread of the smaller end of the tapered section of the tool encounters the metal forming the wall of the hole in which the tool is entered, it will be found that the threads will slightly spirally groove the wall of the hole in a manner corresponding with the threads on the tool.

2. As the tapered section of the tool continues to advance further into the nut blank it will be found that the succeeding threads of the gradually increasing diameter of the tapered section will follow the marks or grooves made by the preceding threads, the threads on the larger diameter sinking the first made groove deeper and deeper, the swaging portions of the tool displacing or forcing part of the metal of the wall of the nut blank up into the thread groove of the tool. In other words, the metal is not cut away to form the thread in the nut blank and it is not compressed, but is re-formed or reshaped by a swaging or forging action, and built up into the thread groove of the tool until finally as the large part of the threaded tool head passes through the blank, the thread formed on the blank is the counterpart of that on the thread swaging portions of the tool.

This action is well illustrated in Fig. 1, wherein the nut blank designated 19 is shown by full lines at the start of the thread forming operation, and by dotted lines at 19ᵃ and 19ᵇ at intermediate points of the thread swaging operation between the beginning and end thereof, the thread being practically completed at the position 19ᵇ. This view illustrates clearly the manner in which the metal at the inner portion of the blank is re-shaped and swaged or otherwise forced up into the thread of the tool.

As already stated, the thread provided on the tool has alternate full formed and partially formed portions, the partially formed portions being flattened as already explained. The thread is therefore continuous in its spiral travel around the head of the tool from the smaller to the larger end, there being instead of the abrupt cutting faces of an ordinary tap, the tapered or V-shaped portions 18ᶜ where the flattened portions 18ᵃ and full depth portions 18 merge. In these respects the tool differs in shape from an ordinary thread cutting tap.

Having described my invention, I claim:

1. The method of threading a nut blank, which comprises causing the thread forming portion of a thread-swaging tool to pass through the nut by the axial movement of one relative to the other while one part is rotated relative to the other about an axis common to both, and as the parts are given their relative axial and rotary movements, continuously displacing the metal on the inner part of the blank to cause it to assume thread form which is gradually deepened as the relative motions taken place until the thread is the counterpart of that on the tool.

2. A tool for threading nuts by a swaging process having an externally threaded portion with alternate round and flattened portions.

3. A tool for forming threads in nut blanks having a head with relatively depressed portions and with threads extending uninterruptedly around the head.

4. A tool for forming threads in nut blanks having a tapered thread swaging head with alternate circular and non-circular portions spaced circumferentially, and having threads formed in both portions.

5. A tool for forming threads in nut blanks having an externally threaded tapered head and having the threads flattened at intervals and devoid of cutting faces but extending continuously around the head.

6. A tool for forming threads in nut blanks comprising a threaded head with circumferentially spaced full threaded portions and intermediate portions in which the threads are of less depth, the threads extending uninterruptedly around the head.

7. A tool for swaging threads in nut blanks having a plurality of external circumferentially spaced thread swaging portions devoid of cutting faces and intermediate relatively depressed portions gradually merging therewith.

In testimony whereof, I hereunto affix my signature.

OTTO HARRY DE LAPOTTERIE.